(12) United States Patent
Nunn

(10) Patent No.: US 6,317,828 B1
(45) Date of Patent: Nov. 13, 2001

(54) BIOS/UTILITY SETUP DISPLAY

(75) Inventor: Susan Nunn, Austin, TX (US)

(73) Assignee: Dell USA, L.P., Round Rock, TX (US)

(*) Notice: Subject to any disclaimer, the term of this patent is extended or adjusted under 35 U.S.C. 154(b) by 0 days.

(21) Appl. No.: 09/191,833

(22) Filed: Nov. 13, 1998

(51) Int. Cl.[7] .................................................. G06F 15/177
(52) U.S. Cl. ............................................................ 713/2
(58) Field of Search ............................. 713/1, 2; 710/1, 710/8–15

(56) References Cited

U.S. PATENT DOCUMENTS

| | | | |
|---|---|---|---|
| 5,361,358 | * 11/1994 | Cox et al. ................................. | 713/2 |
| 5,504,905 | * 4/1996 | Cleary et al. ............................. | 713/1 |
| 5,696,968 | 12/1997 | Merkin .................................. | 395/652 |
| 5,727,213 | 3/1998 | Vander Kamp et al. ............ | 395/681 |
| 5,860,001 | * 1/1999 | Cromer et al. ........................... | 713/1 |
| 5,999,989 | * 12/1999 | Patel ........................................ | 710/1 |

OTHER PUBLICATIONS

IEEE Standard for Boot (Initialization Configuration) Firmware: Core Requirements and Practices, IEEE Std 1275–1994, Mar. 17, 1994, pp. 1–43.*

* cited by examiner

Primary Examiner—Thomas Black
Assistant Examiner—Mary Wang
(74) Attorney, Agent, or Firm—Skjerven Morrill MacPherson LLP; Ken J. Koestner; Margaret M. Kelton

(57) ABSTRACT

A method and computer system for a system setup program includes a routine for displaying a subset of bootable devices from an adapter card, such as a PERC card, on a system from which a user may specify a bootable device to serve as a boot drive, and bootable devices to serve as alternative boot drives. The computer system includes a system Basic Input/Output System (BIOS), a system processor, a system memory coupled to the system processor, at least one expansion slot coupled to the system processor via a bus, at least one adapter coupled to the computer system via the at least one expansion slot, and a system BIOS ROM code. The BIOS ROM code detects a plurality of bootable devices on the computer system, selects from the plurality of bootable devices a preselected number of bootable devices for display, and displays the subset of bootable devices on a setup display. The setup display allows a user to specify a bootable device to serve as a boot drive of the computer system. The method includes detecting a plurality of bootable devices on the computer system, selecting from the plurality of bootable devices a preselected number of bootable devices for display, and displaying the subset of bootable devices on a setup display. The setup display allows a user to specify a bootable device to serve as a boot drive from the computer system.

31 Claims, 2 Drawing Sheets

BIOS/UTILITY SETUP DISPLAY

BACKGROUND OF THE INVENTION

1. Field of the Invention

This invention relates in general to computer systems, and more specifically to a BIOS/Utility Setup display program.

2. Description of the Related Art

Personal computer systems have attained widespread use. A personal computer system can usually be defined as a desktop or portable microcomputer that includes a system unit having a system processor or central processing unit (CPU) with associated memory, a display panel, a keyboard, a hard disk storage device or other type of storage media such as a floppy disk drive or a compact disk read only memory (CD ROM) drive. These personal computer systems are information handling systems which are designed primarily to give independent computing power to a single user or group of users.

One of the methods typically used to initialize devices on a personal computer system is called the Basic Input/Output System (BIOS). The BIOS is a program embedded in an integrated circuit component located on the personal computer's main circuit board or mother board. The BIOS runs the Power-On-Self-Test (POST), which is included as part of the BIOS. The POST software initializes the computer hardware so that the computer's operating system can be loaded. All bootable devices must be initialized prior to loading the operating system in order to boot-strap the computer system. Such devices include any Initial Program Load (IPL) devices such as floppy drives or hard drives that can boot-strap and load an operating system.

In order to inform the BIOS of the devices and options installed on a system, computer systems record setup information in a storage system that can be referenced quickly during bootup, typically in nonvolatile system setup memory. A setup program allows the user to configure the operating system and select a particular IPL device. Pressing a particular key on the keyboard during BIOS initialization executes the setup program. Once the setup program executes, the operating system for a computer is loaded from a particular IPL device. A user sets up the particular IPL device through the system Setup program which is part of the BIOS.

The BIOS Boot Specification, Version 1.01, Jan. 11, 1996, ("BIOS Boot Specification") promulgated by "COMPAQ COMPUTER CORPORATION™", "PHOENIX TECHNOLOGIES, LTD™". and "INTEL CORPORATION™", is incorporated herein by reference. The BIOS Boot Specification (BBS) provides a method for the BIOS to identify all IPL devices on a computer system. According to the BBS, the user, through the Setup program, prioritizes the IPL devices so that the system will attempt to boot using each bootable device selected in the order specified. Prioritizing IPL devices is similar to the commonly known boot priority system of attempting to boot using floppy drive A first, then hard drive C. The difference is that the BBS can include additional IPL devices such as a bootable AT Attachment Packet Interface ("ATAPI") CD-ROM drive, a Personal Computer Memory Card Industry Association ("PCMCIA") drive, an embedded network adapter, and "Plug-n-Play" (PnP) devices.

Although the additional IPL devices enable numerous boot options for usage by the user when running the Setup program, the BBS display of bootable devices in the Setup program fails to display all possible bootable drives when the number of possible bootable devices exceeds the displayable option space limit. For example, if four PowerEdge Raid Controllers™ (PERC) adapter cards are connected in a system holding eight disk pods, such as a Dell Poweredge™ Scalable Disk Storage 100 (SDS 100) unit. In addition, each disk pod in the system contains eight bootable devices, Thus, the user can select from 64 possible bootable devices in theory. The Setup program may be capable of displaying only a fraction of the bootable device selections due to limits in option space. This is a limitation inherent in the BBS standard.

A need has been felt for a Setup Program that is able to display IPL devices as bootable devices according to the BBS standard in a user-friendly manner.

SUMMARY OF THE INVENTION

The present invention accordingly provides a method and computer system for a system setup program that include displaying a subset of bootable devices from an adapter card, such as a PERC card, on a system from which a user may specify a bootable device to serve as a boot drive, and bootable devices to serve as alternative boot drives. The computer system includes a system Basic Input/Output System (BIOS), a system processor, a system memory coupled to the system processor, at least one expansion slot coupled to the system processor via a bus, at least one adapter coupled to the computer system via the at least one expansion slot, and a system BIOS ROM code. The BIOS ROM code detects a plurality of bootable devices on the computer system, selects from the plurality of bootable devices a preselected number of bootable devices for display, and displays the subset of bootable devices on a setup display. The setup display allows a user to specify a bootable device to serve as a boot drive of the computer system.

The method includes detecting a plurality of bootable devices on the computer system, selecting from the plurality of bootable devices a preselected number of bootable devices for display, and displaying the subset of bootable devices on a setup display. The setup display allows a user to specify a bootable device to serve as a boot drive from the computer system.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
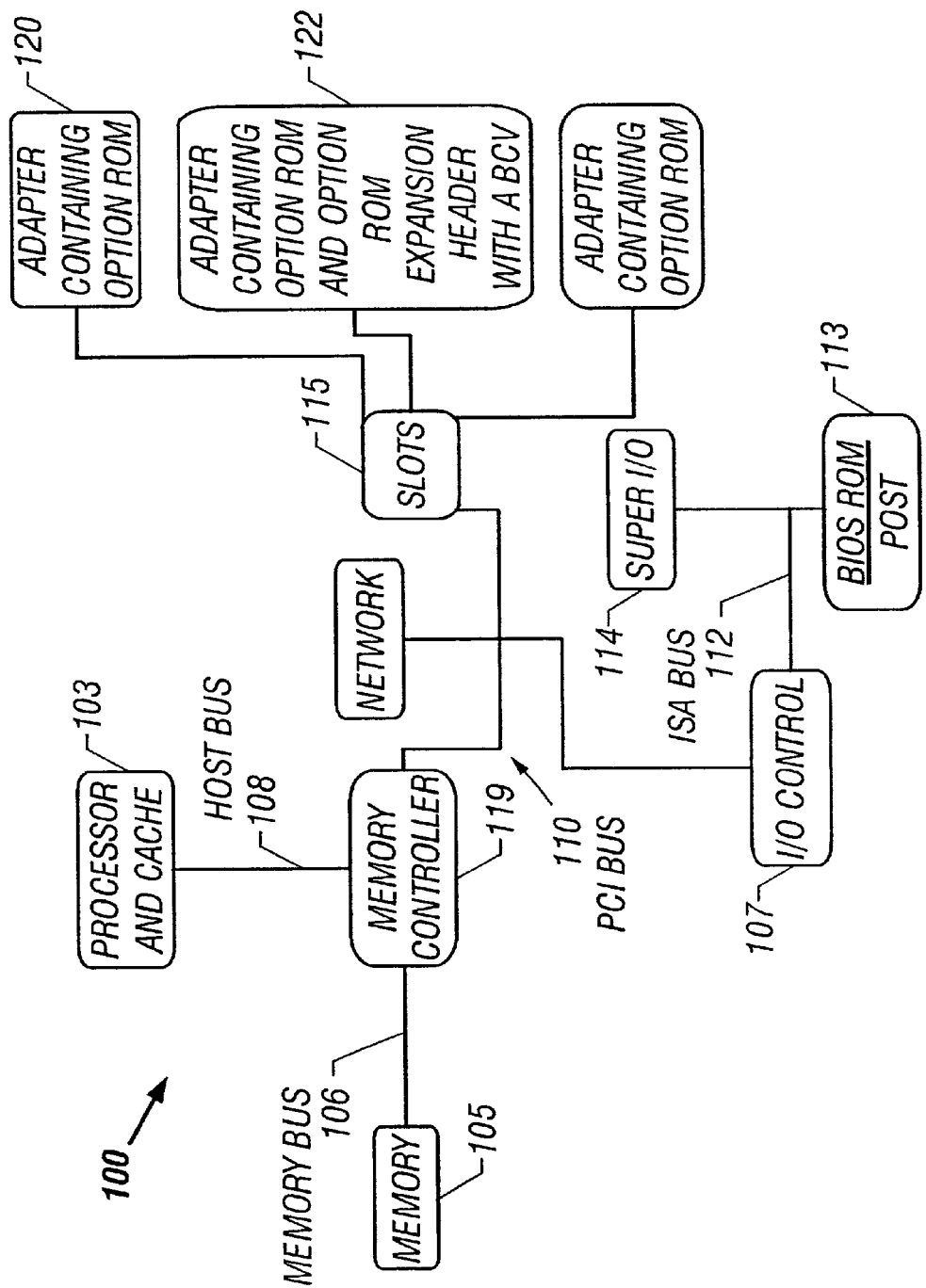
FIG. 1 is a schematic block diagram of a computer system that is suitable for operating a BIOS/Utility Setup Display according to an embodiment of the present invention.

The following sets forth a detailed description of a mode for carrying out the invention. The description is intended to be illustrative of the invention and should not be taken to be limiting.

The BBS described above and incorporated herein for all purposes as Appendix A, defines the priority of the Boot Connection Vector (BCV). The BCV is a pointer that points to code for loading the operating system, the boot code, located inside the option ROM. The initialization code in the option ROM performs device initialization, detects whether a peripheral is attached, and optionally hooks INT 13*h*. The BCV resides in a PnP option ROM Expansion Header. An option ROM is located on a given adapter or a device with drives attached. The option ROM stores an initialization code on an option ROM header. A valid option ROM header as defined by the BBS has an Expansion Header with an address within the standard option ROM header. The Expansion Header contains the information used to configure the devices connected through the adapter. The Expansion Header also contains pointers (BCVS) to code in the device's option ROM (the BCV) that BIOS uses to call to boot from the device.

A typical BCV device is a SCSI controller. SCSI controllers are not directly bootable, but by hooking into the BIOS'INT 13*h* services, the SCSI controller drives are added to the system and drive numbers are appended to existing drives. A BCV device is only bootable if a BCV device drive is installed before any other drives in the system. Therefore, control of the order of installation is desirable.

The BCV Priority is specified by a user of INT 13*h* device controllers in a priority list arranged during a setup operation. INT 13*h* is a basic BIOS subroutine that controls part of the configuration of bootable drives. During a Power-On Self-Test (POST), the appropriate INT 13*h* drive support is called for the controllers on the priority list in the order specified by the user. The controllers are listed to control the order of installation of devices using INT 13*h*. Many INT 13*h* devices can be managed by one controller. The user specifically sets the order of priority to account for inconsistencies in booting operations of typical PCs and devices. For example, if an Advanced Technology Attachment (ATA) support that is resident in BIOS is installed before the BIOS option ROM scan, the ATA is first to install into the INT 13*h* services. As a result, bootable drive number 80*h*, commonly known as drive "C", is specified as an ATA drive and devices initialized 81*h* or higher are rendered non-bootable.

An INT 13*h* device controller installs one or more drives into the BIOS INT 13*h* services by hooking the INT 13*h* software interrupt and chaining to the old vector. By chaining, the INT 13*h* software is connected through a software routine call inserted into the old vector. The software routine call refers the program to the INT 13*h* software, thereby hooking the INT 13*h* software interrupt. The controller can be a PnP Card with a BCV. According to the BBS, the first type of entry in the BCV Table is the BIOS INT 13*h* services for ATA drives. The ATA drive support in the BIOS is to be installable in any order that a user selects; before, in the middle, or after other controllers are installed.

Referring to FIG. 1, a block diagram shows a computer system that is suitable for operating a BIOS/Utility display routine. Computer system 100 is a server or work station that includes a system processor 103 with cacahe, such as the PENTIUM™ II microprocessor sold by the INTEL™ CORP. Computer system 100 includes an ISA bus 112 coupled to an input/output controller 107 that is often operable coupled to auxiliary devices (not shown), which may include a pointer device, such as a mouse.

The computer system 100 includes a system processor 103 with cache and a memory controller 119 connected to the processor 103 with cache via a local bus or a host bus 108. A system BIOS 113 is connected to the memory controller 119 via a PCI bus 110 and an ISA bus 112. Alternatively, instead of an ISA bus, the System BIOS 113 could be coupled to the computer system 100 via a local or host bus. Connected to the PCI Bus 110 are Slots 115, representing different expansion slots. Controllers for controlling adapter cards are inserted into the expansion slots. The adapter cards are shown as adapters containing option ROMs 120 and adapters containing option ROM Expansion Headers with a BCV 122.

The computer system 100 executes the BIOS ROM setup code when the system is first powered. A BIOS ROM setup code enables the user to control the order of the drives as defined within the setup program and allows a user to control the order of drives for the operating system to be initialized as a boot drive. In the normal operation of the BIOS ROM setup code, the setup program presents to a user a list of optional adapter selections. However, the space provided in the setup program for displaying bootable device choices may be limited. An illustrative BIOS/Utility Setup Display program controls the number of bootable devices connected to an adapter card that are displayed as options in the BIOS ROM setup code. The program efficiently uses a BIOS ROM setup code space for displaying a limited number of bootable drive selections. For example, the setup code allocates display space among bootable drive selections of multiple adapters. Thus, a particular adapter with a plethora of bootable drive selections does not take up the display area available. The customized BIOS ROM setup code selects a predetermined number of drives from the individual adapter cards to display as bootable drive selections in the option list. The BIOS ROM setup code allows a subset number of bootable drives from the adapters to be displayed and treats remaining bootable drives as active drives that are not controlled as bootable drives.

Figure 2:
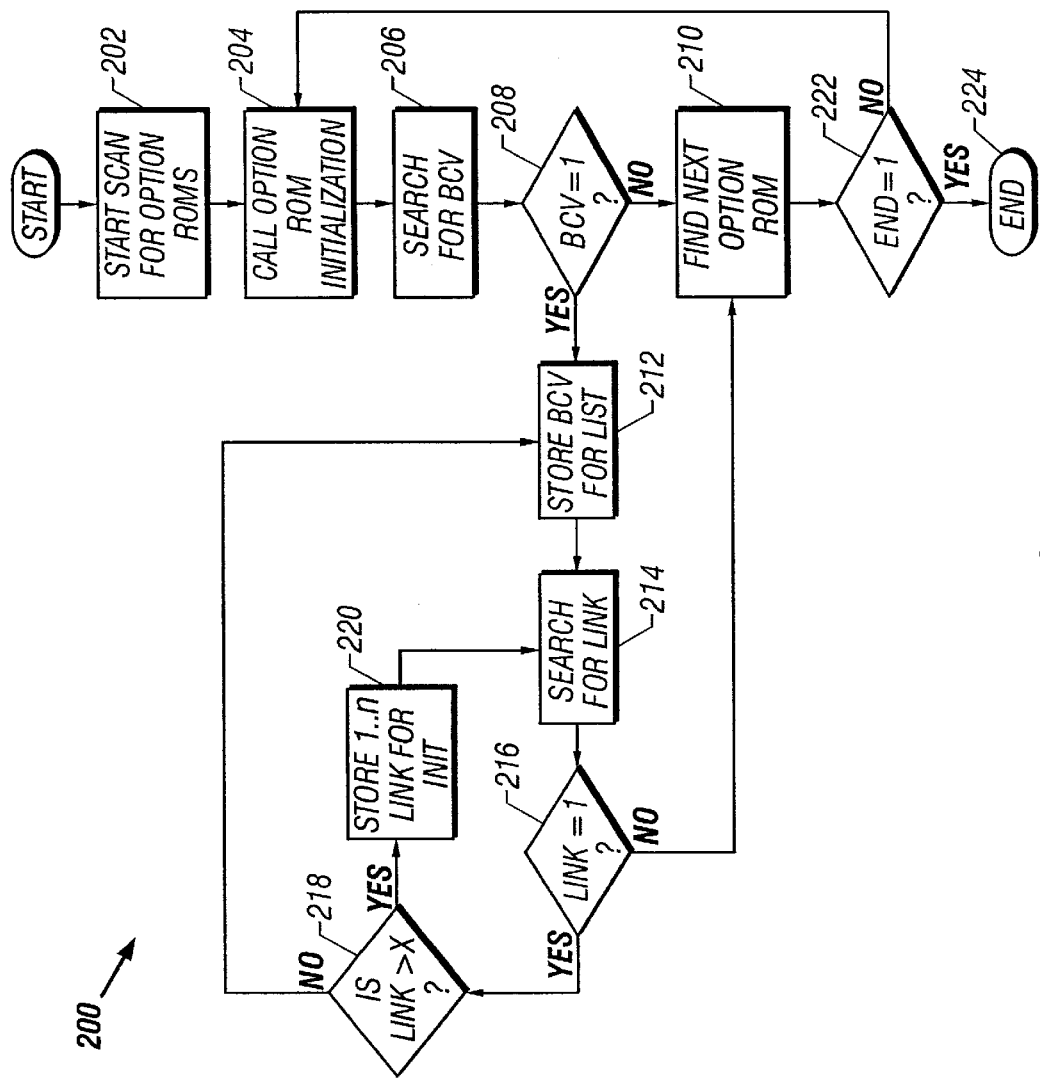
FIG. 2 is a flowchart showing a method of operating the BIOS/Utility Setup Display of FIG. 1.

Referring to FIG. 2, a flow chart diagram shows a method 200 for selecting the number of bootable devices connected to an adapter card when displaying the bootable devices options in a BIOS/Utility Setup program.

A first operation in the method is scanning for option ROMs 202. During the scan, a call function is executed in which each adapter with a valid option ROM has associated operating code loaded into a specified section of memory space. During adapter code loading, expansion header information is saved and linked expansion headers are stored into variables for non-controllable devices.

A next operation is option ROM initialization 204, during which a routine jumps to the initial entry point for the option ROM and the code runs the BIOS on the option ROM card. The routine queries the drives that are attached to the card through, for example, a cabling system. The information is returned to the BIOS when finished. A search for BCVs 206 determines the number of BCVs and whether the device is a hard drive device. Another scan is made for option ROMs 210, followed by a call for option ROM initialization, repeating option ROM initialization 204 followed by the BCV search 206 and another check for a BCV=1 208 until all option ROMs are processed.

If BCV is equal to 1 in logic operation 208, another BCV is found and the BCV is stored in a list for the controllable devices 212. Following storing of the BCV, the routine searches for a link 214, a link search for a pointer for the next BCV. If a link is found, in logic operation 216 a query determines whether enough space is available to increase the number of BCVs in the controllable list 218. The capacity of the BCV list is determined by the number of spaces for displayed drives and is selected by a user during system BIOS setup. Enforcement of the limitation in displayed BCV entries in operation 218 prevents the BIOS code from automatically displaying all BCVs connected to an option ROM, thereby filling all available display spaces on the setup screen. For example, if an option ROM has three BCVs and a setup screen has only three spaces available for optional controllable devices, the setup screen capacity is filled. No option ROM or drive attached to the system is accessible by the user for usage as a controllable drive simply because no space is available on the setup screen for displaying the options. The other option ROMs are thus made available only as data drives. The list capacity is a variable in the system BIOS code that provides the number of BCVs per option ROM that is permitted for storage in the list of controllable devices for user selection.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein may be made based on the description set forth herein, without departing from the spirit and scope of the invention as set forth in the following claims.

What is claimed is:

1. A method of operating a computer system having a system Basic Input/Output System (BIOS), the method comprising:

detecting a plurality of bootable devices on the computer system;

selecting from the plurality of bootable devices a subset of a preselected number of bootable devices for display; and displaying the subset of bootable devices on a setup display from which a user specifies a bootable device to operate as a boot drive of the computer system.

2. The method according to claim 1, wherein detecting a plurality of bootable devices on the computer system further comprises:

scanning for option ROMs; and calling option ROM initialization codes.

3. The method according to claim 1, wherein selecting from the plurality of bootable devices a subset of bootable devices for display further comprises:

searching for at least one Boot Connection Vector (BCV);

storing the at least one BCV in a list; and comparing the preselected number of bootable devices against the number of BCVs in the list.

4. The method according to claim 3, wherein comparing the preselected number of bootable devices against the number of BCVs in the list further comprises:

searching for a link;

determining a number of links that are found;

checking the number of links that are found against the preselected number of bootable devices;

if for a link the number of links that are found is greater than the preselected number of bootable devices allocated to the option ROM, storing an identifier of the link found for initialization as a nonbootable device for initialization; and if the number of links that are found is less than the preselected number of bootable devices allocated to the option ROM, storing an identifier of the link in the list of BCVs.

5. The method according to claim 4, further comprising:

if the number of links that are found is zero, scanning for an option ROM;

if the number of option ROMS found is zero, ending the method.

6. The method according to claim 1, wherein:

the plurality of bootable devices includes at least one option ROM, the at least one option ROM coupled to further bootable devices; and displaying the subset of bootable devices includes displaying the further bootable devices.

7. The method according to claim 1, further comprising:

classifying a subset of the plurality of bootable devices as active devices independent from control as bootable devices.

8. The method according to claim 1, wherein the method is performed in a BIOS ROM setup code.

9. The method according to claim 1, wherein the bootable devices are coupled to at least one adapter card inserted into at least one expansion slot.

10. The method of claim 9, wherein the adapter card is a Plug and Play (PnP) adapter card with a BCV.

11. The method of claim 1 wherein the plurality of bootable devices consists of initial program load (IPL) devices.

12. A computer system having a system Basic Input/Output System (BIOS), the computer system comprising:

a system processor;

at least one adapter coupled to the computer system; and a system BIOS ROM code coupled to the system processor, the system BIOS ROM code including a setup code that has limited space for displaying bootable devices preventing the setup code from displaying all possible bootable drives when the number of possible bootable devices exceeds a displayable option space limit, wherein the system BIOS ROM code detects a plurality of bootable devices on the computer system, including bootable devices coupled to one or more adapter cards, selects from the plurality of bootable devices a subset of a preselected number of bootable devices for display from each adapter card, and displays the subset of bootable devices on a setup display from which a user specifies a bootable device to serve as a boot drive of the computer system.

13. The computer system of claim 12, wherein the system BIOS ROM code scans for option ROMs and calls option ROM initialization codes.

14. The computer system of claim 12, wherein the system BIOS ROM code that selects from the plurality of bootable devices a subset of bootable devices for display further searches for at least one Boot Connection Vector (BCV), stores the at least one BCV in a list, and compares the preselected number of bootable devices against the number of BCVs in the list.

15. The computer system of claim 14, wherein the system BIOS ROM code that compares the preselected number of bootable devices against the number of BCVs in the list further searches for a link, determines the number of links found, checks the number of links found against the preselected number of bootable devices, and if the number of links found is greater than the preselected number of bootable devices allocated to the option ROM, stores the link for initialization as a nonbootable device for initialization, and if the number of links found is less than the preselected number of bootable devices allocated to the option ROM, stores the link in the list of BCVs.

16. The computer system of claim 15, wherein the system BIOS ROM code scans for option ROMs if the number of links found is zero, and ends the method if the number of option ROMs found is zero.

17. The computer system of claim 12, wherein:

the plurality of bootable devices includes at least one option ROM, the at least one option ROM coupled to further bootable devices; and the subset of bootable devices includes the further bootable devices.

18. The computer system of claim 12, wherein a subset of the plurality of bootable devices is classified as active devices independent from control as bootable devices.

19. The computer system of claim 12, wherein the bootable devices are coupled to the one or more adapter cards, the one or more adapter cards being coupled to the computer system via at least one expansion slot.

20. The computer system of claim 19, wherein the adapter card is a Plug and Play (PnP) adapter card with a BCV.

21. The computer system of claim 12 wherein the plurality of bootable devices consists of initial program load (IPL) devices.

22. A computer program product comprising:

a computer readable media including a system Basic Input/Output System (BIOS) routine operable with a setup code that has limited space for displaying bootable devices preventing the setup code from displaying all possible bootable drives when the number of possible bootable devices exceeds a displayable option space limit, the routine including:

detecting a plurality of bootable devices on the computer system, including bootable devices couple to one or more adapter cards;

selecting from the plurality of bootable devices a subset of a preselected number of bootable devices for display from each adapter card; and displaying the subset of bootable devices on a setup display from which a user specifies a bootable device to operate as a boot drive of the computer system.

23. The computer program product of claim 22 wherein detecting a plurality of bootable devices on the computer system further comprises:

scanning for option ROMs; and calling option ROM initialization codes.

24. The computer program product of claim 22 wherein selecting from the plurality of bootable devices a subset of bootable devices for display further comprises:

searching for at least one Boot Connection Vector (BCV);

storing the at least one BCV in a list; and comparing the preselected number of bootable devices against the number of BCVs in the list.

25. The computer program product of claim 22 further comprising: classifying a subset of the plurality of bootable devices as active devices independent from control as bootable devices.

26. The computer program product of claim 24 wherein comparing the preselected number of bootable devices against the number of BCVs in the list further comprises:

searching for a link;

determining a number of links that are found;

checking the number of links that are found against the preselected number of bootable devices;

if for a link the number of links that are found is greater than the preselected number of bootable devices allocated to the option ROM, storing an identifier of the link found for initialization as a nonbootable device for initialization; and if the number of links that are found is less than the preselected number of bootable devices allocated to the option ROM, storing an identifier of the link in the list of BCVs.

27. The computer program product of claim 21 further comprising:

if the number of links that are found is zero, scanning for an option ROM; and if the number of option ROMS found is zero, ending the method.

28. The computer program product of claim 22 wherein:

the plurality of bootable devices includes at least one option ROM, the at least one option ROM coupled to further bootable devices; and displaying the subset of bootable devices includes displaying the further bootable devices.

29. The computer program product of claim 22 wherein the bootable devices are coupled to at least one adapter card inserted into at least one expansion slot.

30. The computer program product of claim 29 wherein the adapter card is a Plug and Play (PnP) adapter card with a BCV.

31. An article of manufacture comprising a computer readable media of signal for implanning a software program operable with a BIOS ROM setup code that has limited space for displaying all possible bootable drives when the number of possible bootable devices exceeds a displayable option space limit including:

means for detecting a plurality of bootable devices on the computer system, including bootable devices coupled to one or more adapter cards;

mean for selecting from the plurality of bootable devices a subset of a preselected number of bootable devices for display from each adapter card; and user specifies a bootable device to operate as a boot drive of the computer system.

* * * * *